US012774051B2

(12) United States Patent
Park et al.

(10) Patent No.: US 12,774,051 B2
(45) Date of Patent: Oct. 27, 2026

(54) JOINT STRUCTURE OF A VEHICLE BODY

(71) Applicants: HYUNDAI MOTOR COMPANY, Seoul (KR); KIA CORPORATION, Seoul (KR)

(72) Inventors: Suin Park, Hwaseong-si (KR); Tae Han Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 231 days.

(21) Appl. No.: 18/824,498

(22) Filed: Sep. 4, 2024

(65) Prior Publication Data

US 2025/0121898 A1 Apr. 17, 2025

(30) Foreign Application Priority Data

Oct. 12, 2023 (KR) ........................ 10-2023-0135673

(51) Int. Cl.
*B62D 63/02* (2006.01)

(52) U.S. Cl.
CPC .................................. *B62D 63/025* (2013.01)

(58) Field of Classification Search
CPC . B60P 3/42; B60P 3/423; B62D 27/06; B62D 63/025; B62D 65/04; B62D 25/06; B62D 25/08; B62D 27/04; B62D 27/02; B62D 27/023; B62D 27/026
USPC ................................ 296/193.04, 193.03, 29
See application file for complete search history.

(56) References Cited

U.S. PATENT DOCUMENTS 6,129,411 A * 10/2000 Neff .......................... B60P 3/42
296/193.03
2016/0207418 A1* 7/2016 Bergstrom ............... B60G 3/08
2022/0363328 A1* 11/2022 Xin ........................ B62D 65/04

* cited by examiner

*Primary Examiner* — Amy R Weisberg
*Assistant Examiner* — Daniel R Digiovannantonio
(74) *Attorney, Agent, or Firm* — Lempia Summerfield Katz LLC

(57) ABSTRACT

A joint structure of a vehicle body includes: a fixation bar disposed at a rear end of a driving module; a guide pin disposed at a central portion of the fixation bar and protruding to a space module; a pair of extension pins disposed on edge portions of the fixation bar and protruding to the space module; and a guide slot that is recessed from an inner central portion of the space module and extends along a direction opposite to the driving module. The guide pin is inserted into the guide slot. The joint structure further includes; at least one extension slot disposed in the space module and configured to receive the extension pin; and a pair of actuators disposed in the space module and configured to contact two outer sides of the central portion of the guide slot to apply pressure to the outer sides.

19 Claims, 12 Drawing Sheets

JOINT STRUCTURE OF A VEHICLE BODY

CROSS-REFERENCE TO RELATED APPLICATION

This application claims priority to and the benefit of Korean Patent Application No. 10-2023-0135673, filed on Oct. 12, 2023, the entire contents of which are incorporated herein by reference.

BACKGROUND

(a) Field

The present disclosure relates to a joint structure of a vehicle body, and more particularly, to a joint structure of a vehicle body for a purpose built vehicle (PBV).

(b) Description of the Related Art

An automobile industry has been recently introducing a new concept of a future mobility vision to realize a human-centered dynamic future city. One of these future mobility solutions may be a purpose built vehicle (PBV) which is a purpose-based mobility vehicle.

An example of the PBV vehicle may be an eco-friendly mobile vehicle based on an electric vehicle (EV). This PBV vehicle may provide various customized services to a user during a transport time from its origin to destination through an unmanned or manned autonomous traveling manner.

The PBV vehicle may include a cab-type driving module employing a driving device and capable of performing autonomous traveling, and a space module joined to the driving module and used for cargo transportation, passenger use, home office, or the like.

A conventional joint method may generally use a ring-shaped connection and there is no buffer part (e.g., cushioning components) between the driving module and the space module. Thus, a collision may occur due to a clearance between the two modules when the driving module suddenly starts or brakes, which may adversely affect ride comfort and cause the two modules to break away.

The statements in this section merely provide background information related to the present disclosure and may not constitute prior art.

SUMMARY

The present disclosure provides a joint structure of a vehicle body that may prevent a collision between a driving module and a space module by reducing a clearance between the two modules in a front-to-back direction when fastening these two modules to each other and may ensure ride comfort of a passenger boarding the space module.

According to an embodiment, provided is a joint structure of a vehicle body that includes a driving module and a space module joined to a rear end of the driving module. The joint structure includes: a fixation bar disposed at the rear end of the driving module; and a guide pin disposed at a central portion of the fixation bar and protruding to the space module. The joint structure further includes: a pair of extension pins disposed on edge portions of the fixation bar and protruding to the space module; and a guide slot which is recessed from an inner central portion of the space module and extends in a direction opposite to the driving module. The guide pin is inserted into the guide slot. The joint structure further includes: extension slots which are disposed in edge portions of the space module and into which the pair of extension pins are inserted; and a pair of actuators disposed in the space module and configured to respectively contact outer sides of a central portion of the guide slot to apply pressure to the outer sides.

Each of the outer sides of the central portion of the guide slot is connected to an inner side of a guide support included in the space module.

An end of the guide slot may be connected to an inner side of an end of the guide support.

Each of two sides of the guide slot may be supported on the inner side of the guide support by a support spring.

The guide pin may be formed in a cylindrical shape, and the guide slot may be in contact with a side surface of the guide pin.

Guide pin teeth may be formed on each of two outer surfaces of the guide pin in a length direction of the guide pin, and guide slot teeth engaged with the guide pin teeth may be formed on each of two inner surfaces of the guide slot.

The guide pin teeth may be formed on each of the two outer surfaces of the guide pin and inclined in an opposite direction, and the guide slot teeth may be formed on each of the two inner surfaces of the guide slot and inclined in an opposite direction.

The pair of actuators may each have an actuator contact part disposed at an end and configured to move to contact the outer side of the guide slot.

A contact sensor may be disposed at the end of the guide support to detect whether an end of the guide pin is in contact with an inner central end of the guide slot when the guide pin is inserted into the guide slot.

When the end of the guide pin is in contact with the inner central end of the guide slot, the contact sensor may transmit an electrical signal to at least one of the pair of actuators such that the pair of actuators are moved to contact each of the outer sides of the guide slot and apply pressure to the outer sides.

The contact sensor may include a sensor unit, a contact terminal in contact with the guide pin and moved along the inner side of the sensor unit, and a sensor spring interposed between the inner side of the sensor unit and the contact terminal to provide an elastic force to the contact terminal.

The sensor unit may be supported by a stopper limiting an insertion movement distance of the guide pin.

When the guide pin is moved to move the contact terminal and the end of the contact terminal is in contact with the sensor unit, the electrical signal may be generated, the electrical signal may supply power to the pair of actuators through a wire, and the pair of actuators may be operated to contact the outer sides of the central portion of the guide slot to apply pressure to the outer sides of the guide slot.

An extension protrusion part may protrude from an end of each extension pin of the pair of extension pins to the extension slots, and the extension protrusion parts of the pair of extension pins may be inserted into the extension slots.

Each of the extension slots may include: an extension opening, a pair of extension opening supports supporting the extension opening and opposing each other, and a pair of extension pin fixation parts disposed on inner sides of the extension opening supports and gradually getting closer to each other as the extension pin fixation part is closer to the inner side from the extension opening.

When the extension protrusion part is inserted, the extension pin fixation parts are operated to contact a side part of the extension protrusion part and apply pressure to the side part to thus fix the side part.

According to another embodiment, a joint structure of a vehicle body includes a driving module and a space module joined to a rear end of the driving module. In particular, the joint structure includes: a fixation bar disposed at the rear end of the driving module; a guide pin disposed at a central portion of the fixation bar and protruding to the space module; and a guide slot configured to receive the guide pin. The guide slot is configured to recess from an inner central portion of the space module and extend in a direction opposite to the driving module; and a pair of actuators disposed in the space module and configured to contact two outer sides of a central portion of the guide slot and apply pressure to the two outer sides of the central portion.

An end of the guide slot may be connected to an inner side of an end of a guide support of the space module.

Guide pin teeth may be formed on each of outer surfaces of a central portion of the guide pin in a length direction of the guide pin, guide slot teeth engaged with the guide pin teeth may be formed on each of two inner surfaces of the guide slot, the guide pin teeth may be formed on each of the two outer surfaces of the guide pin to be inclined in an opposite direction, and the guide slot teeth may be formed on each of the two inner surfaces of the guide slot to be inclined in an opposite direction.

According to the embodiments of the present disclosure, the joint structure of a vehicle body that includes the driving module and the space module joined to the rear end of the driving module may reduce the clearance between the two modules when the two modules are joined to each other to thus ensure the rigidity of the fastener, and prevent the collision occurring between the two modules during the sudden start or brake of the driving module.

In addition, the structure may simultaneously employ the guide pin joining and the extension pin joining to thus fix the front-to-back or up-down movement of the vehicle, thereby ensuring the ride comfort of the passenger boarding the space module.

In addition, the structure may be widely used not only in the joint method of the PBV vehicle, but also in the method of fastening the trailer and the towing vehicle to each other, and apply the automatic method rather than the manual method, thereby providing the improved marketability.

DETAILED DESCRIPTION

Figure 1:
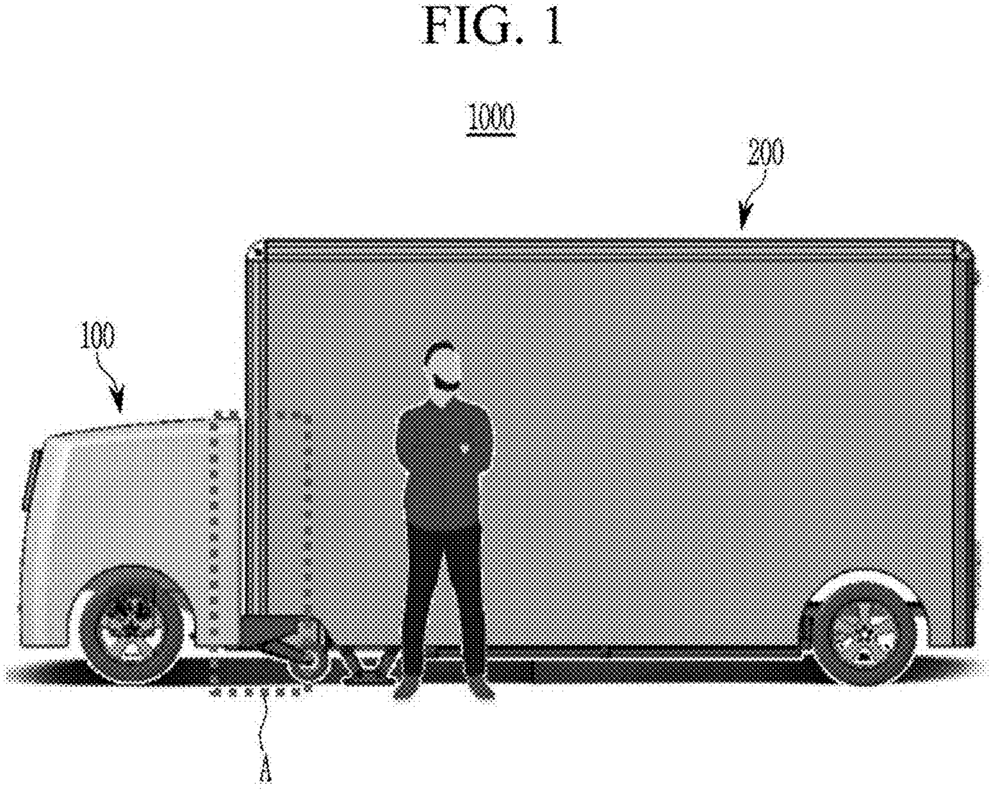
FIG. 1 is a diagram schematically illustrating a vehicle using a joint structure of a vehicle body according to an embodiment of the present disclosure.

Hereinafter, embodiments of the present disclosure are described in detail with reference to the accompanying drawings so that those having ordinary skill in the art to which the present disclosure pertains may easily practice the present disclosure. The present disclosure may be implemented in various different forms and is not limited to the embodiments described herein.

In addition, in several embodiments, components having the same configuration are representatively described using the same reference numerals in an embodiment, and only components different from those of an embodiment are described in the other embodiments.

It should be understood that the drawings are schematic and not drawn to scale. The size and proportion of a component in the drawings are shown relatively exaggerated or reduced in size in order to clearly and easily explain the drawings. This arbitrary size is only illustrative and not limitative. In addition, the same reference numeral is used to denote a similar feature of the same structure, element or part shown in two or more drawings. When it is described that an element is referred to as being "on" or "above" another element, it is to be understood that the element may be directly "on" another element or "above" another element having a third element interposed therebetween.

When a component, device, element, or the like of the present disclosure is described as having a purpose or performing an operation, function, or the like, the component, device, or element should be considered herein as being "configured to" meet that purpose or to perform that operation or function.

Some embodiments described in the present disclosure specifically represent exemplary forms of the present disclosure, and thus the present disclosure should not be limited to the specific embodiments, a specific shape of the illustrated portions.

Hereinafter, a joint structure of a vehicle body according to an embodiment of the present disclosure is described in detail with reference to the accompanying drawings.

Figure 2:
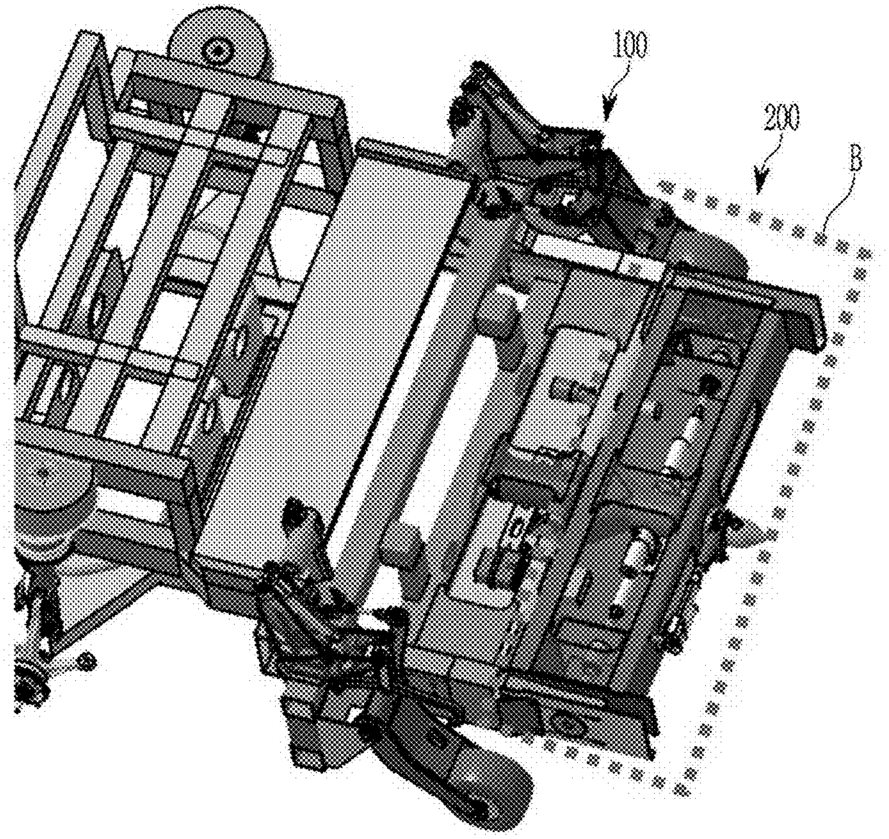
FIG. 2 is a diagram schematically illustrating a joint state of a portion "A" of FIG. 1.

FIG. 1 is a diagram schematically showing a vehicle using a joint structure of a vehicle body according to an embodiment of the present disclosure; and FIG. 2 is a diagram schematically showing a joint state of portion "A" of FIG. 1.

Referring to FIGS. 1 and 2, the joint structure of a vehicle body according to an embodiment of the present disclosure may be applied to, for example, a purpose-based mobility vehicle (or a purpose built vehicle, hereinafter referred to as a "PBV vehicle").

The PBV vehicle may be used as an electric vehicle-based life module vehicle providing various customized services to a user during a transport time from its origin to destination.

A vehicle body of the PBV vehicle may be suitable for small quantity production of various vehicle types having a small number of parts, and may be manufactured in various shapes and sizes.

In an embodiment of the present disclosure, a vehicle 1000 may include a cab-type driving module 100 and a one box-type space module 200 joined to the rear of the driving module 100.

The present disclosure may be employed not only in the PBV vehicle configured by joining the driving module 100 and the space module 200 to each other, but also in a method of fastening a towing vehicle and a trailer to each other.

Figure 3:
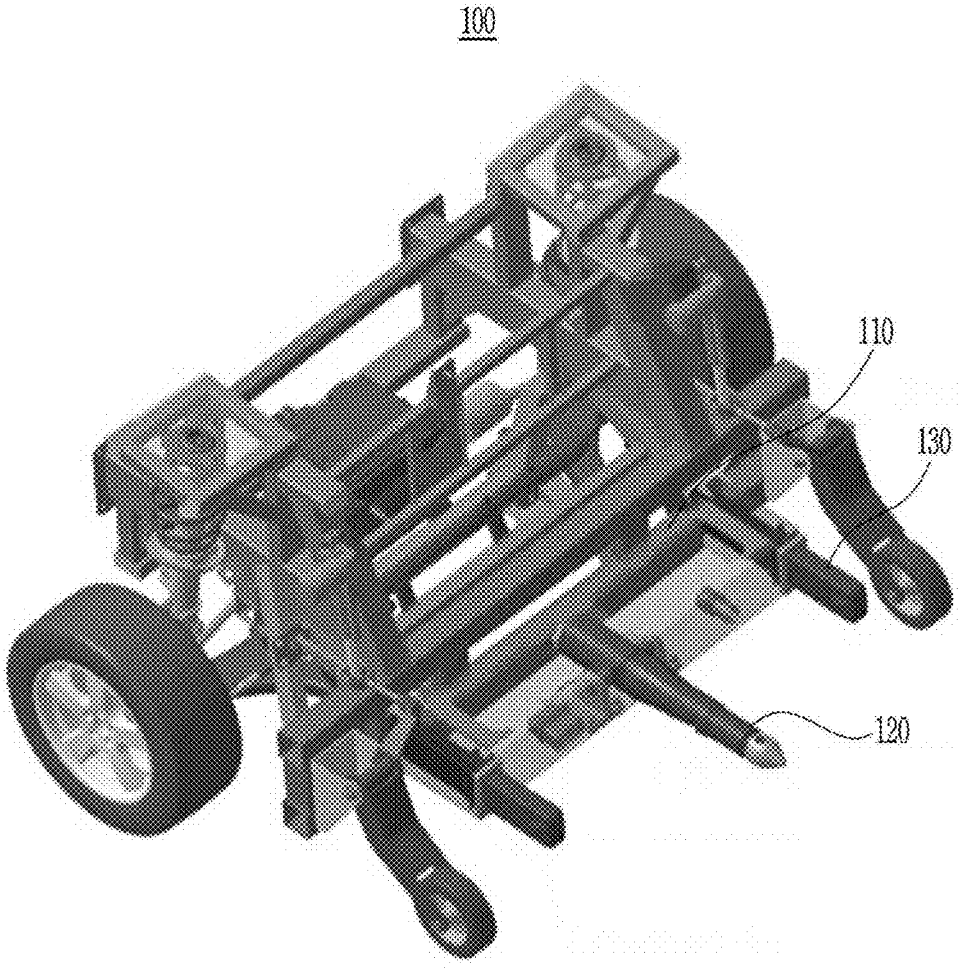
FIG. 3 is a diagram schematically illustrating a driving module in the joint structure of a vehicle body according to an embodiment of the present disclosure.
Figure 4:
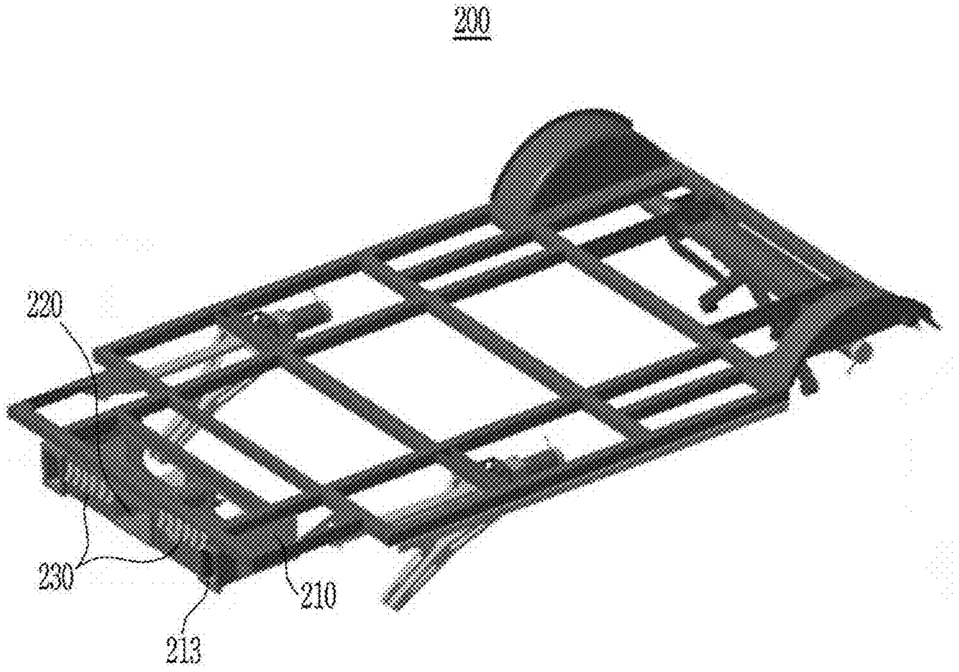
FIG. 4 is a diagram schematically illustrating a space module in the joint structure of a vehicle body according to an embodiment of the present disclosure.

FIG. 3 is a diagram schematically showing the driving module in the joint structure of a vehicle body according to an embodiment of the present disclosure; and FIG. 4 is a diagram schematically showing the space module in the joint structure of a vehicle body according to an embodiment of the present disclosure.

Referring to FIGS. 3 and 4, in the joint structure of a vehicle body according to an embodiment of the present disclosure, the driving module 100 may include a fixation bar 110, a guide pin 120, and an extension pin 130. In addition, the space module 200 may include a guide slot (or a guider) 220, an extension slot 213, and an actuator 240.

The fixation bar 110 may form a rear end of the driving module 100, have a rectangular bar shape extending in a direction perpendicular to a length direction of the vehicle body, and serve as a framework of a joint portion of the driving module 100.

A guide pin 120 may be disposed at a central portion of the fixation bar 110 and protrude to the space module 200. The guide pin 120 may have a cylindrical shape, and may have a diameter that becomes smaller as being further away from the fixation bar 110. In addition, an end of the guide pin 120 may be formed in a pointed shape. This shape may allow the guide pin 120 to be inserted smoothly into the guide slot 220.

The extension pin 130 may protrude from an edge portion of the fixation bar 110 to the space module 200. The extension pin 130 may be formed in a rectangular bar shape, and the pair of extension pins 130 may be disposed on the edge portions of the fixation bar 110.

Figure 5:
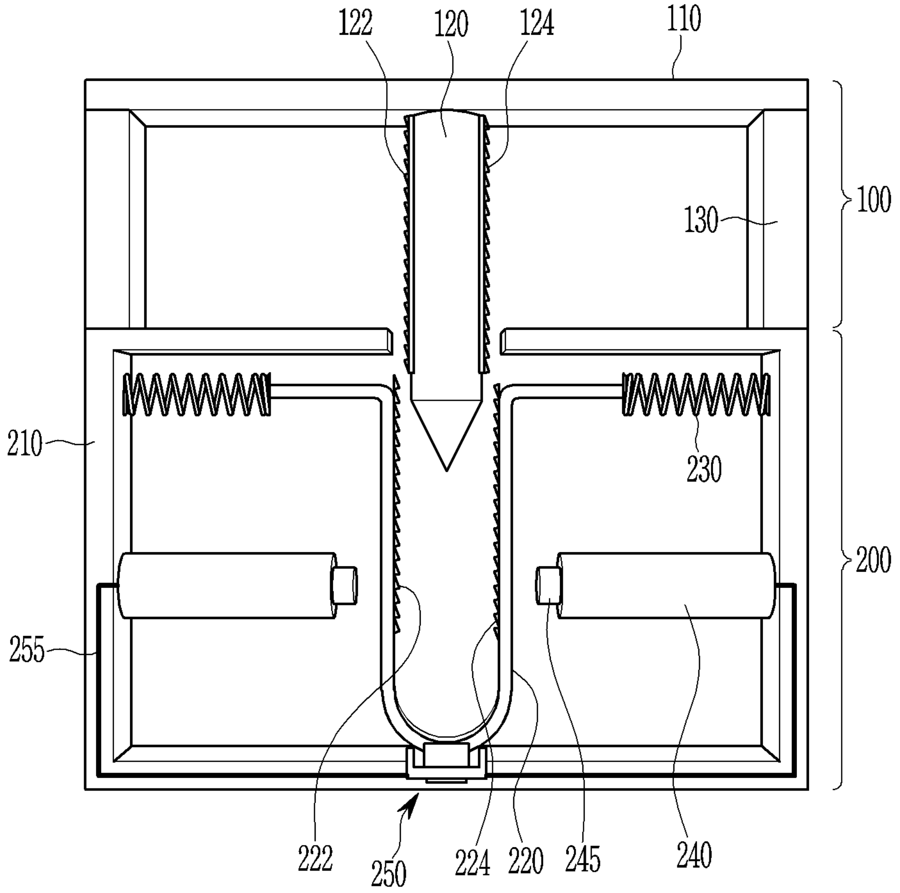
FIG. 5 is a diagram schematically illustrating a state before joint of a vehicle body in the joint structure of a vehicle body according to an embodiment of the present disclosure.

The guide slot 220 may be formed in a central portion of an inner side of the space module 200. The guide slot 220 may be an opening formed in a guide support 210 of the space module 200. Referring to FIG. 5, in another embodiment, the guide slot 220 may be formed in a shape of a pincer retreating from the inner side of the space module 200 to an opposite side of the driving module 100. For example, the guide slot 220 includes end portions and a middle portion (i.e., a central portion) that forms a slot to receive the guide pin 120. The central portion extends in a direction opposite to (i.e., an opposite direction) the driving module 100, forming a "U" shape (See, FIG. 5). When the guide pin 120 has been inserted into the guide slot 220, the guide slot 220 may be in contact with two outer sides of the guide pin 120 and fix the guide pin 120 to the guide slot 220.

The pair of extension slots 213 may be disposed in edge portions of the space module 200. The pair of extension pins 130 disposed on the edge portions of the fixation bar 110 may be inserted into the extension slots 213.

The actuator 240 may be disposed in the space module 200, and may be in contact with each of two outer sides of the central portion of the guide slot 220 to apply pressure thereto. The actuator 240 may be operated by an electrical signal. The guide slot 220 may maintain the guide pin 120 to be fixed when the actuator 240 is operated to apply pressure to the guide slot 220 while the guide pin 120 is inserted into the guide slot 220.

Figure 6:
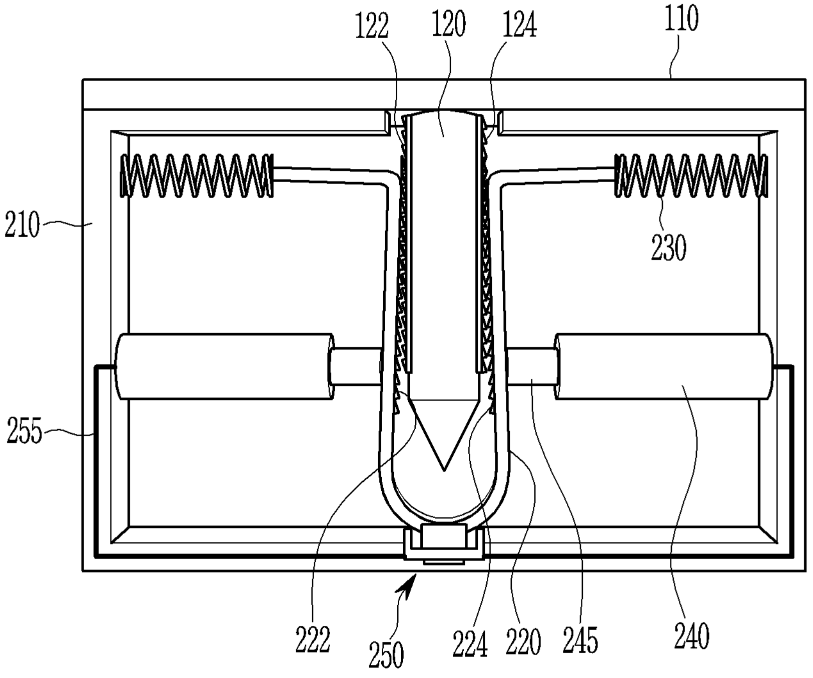
FIG. 6 is a diagram schematically showing a state after the joint of the vehicle body in the joint structure of a vehicle body according to an embodiment of the present disclosure.
Figure 7:
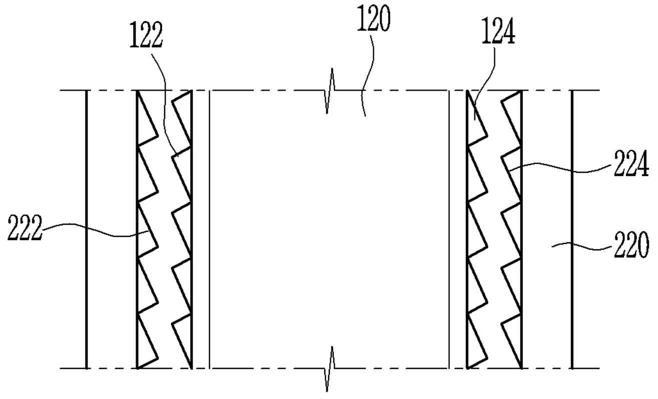
FIG. 7 is a diagram schematically showing a joint relationship between a guide pin and a guide slot in the joint structure of a vehicle body according to an embodiment of the present disclosure.
Figure 8A:
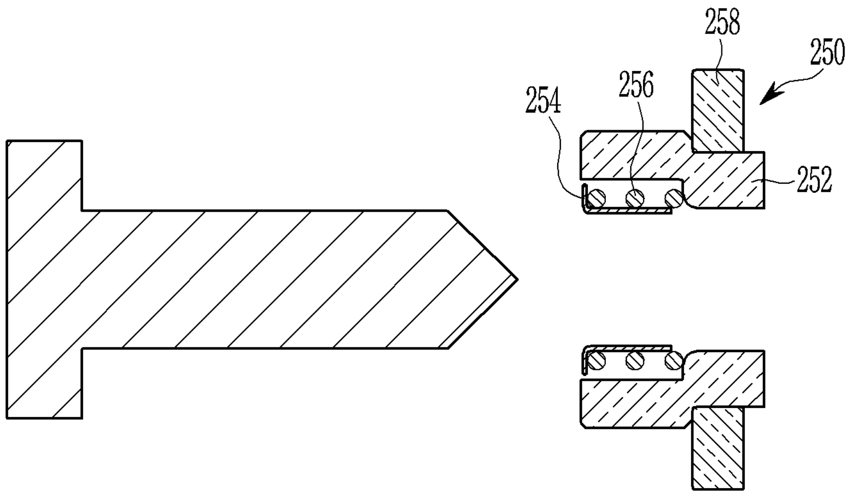
FIGS. 8A and 8B are diagrams schematically showing states before and after the guide pin is in contact with a contact sensor in the joint structure of a vehicle body according to an embodiment of the present disclosure.
Figure 8B:
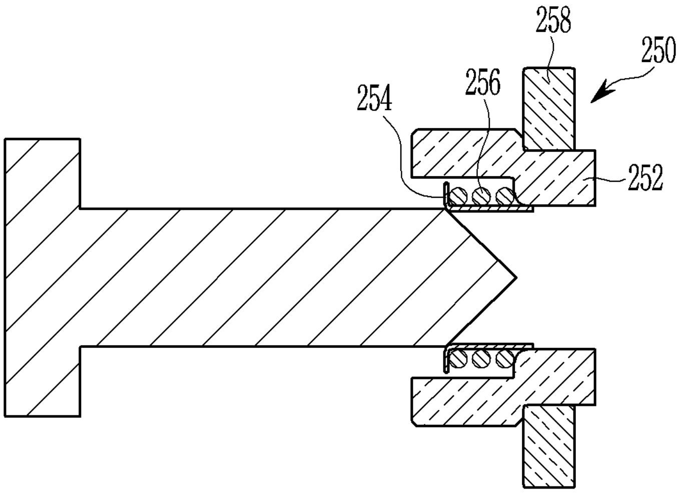

FIG. 5 is a diagram schematically showing a state before joint of the vehicle body in the joint structure of a vehicle body according to an embodiment of the present disclosure. In other words, FIG. 5 illustrates the state of the joint structure before the guide pin 120 of the driving module 100 is securely coupled to the guide slot 220 of the space module 200. FIG. 6 is a diagram schematically showing a state after the joint of the vehicle body (i.e., after the guide pin 120 of the driving module 100 is securely coupled to the guide slot 220 of the space module 200) in the joint structure of a vehicle body according to an embodiment of the present disclosure. FIG. 7 is an enlarged partial view of the joint structure schematically illustrating a joint relationship and a coupling structure between the guide pin and the guide slot in the joint structure of a vehicle body according to an embodiment of the present disclosure; and FIGS. 8A and 8B are diagrams schematically showing states before and after the guide pin is in contact with a contact sensor in the joint structure of a vehicle body according to an embodiment of the present disclosure.

Referring to FIGS. 5 and 6, the guide slot 220 may be formed in the shape of the pincer retreating from the inner side of the space module 200 to the opposite side of the driving module 100, and each of two ends of the guide slot 220 may be connected to an inner side of the guide support 210 of the space module 200.

The support spring 230 may connect each of the two ends of the guide slot 220 and each of the inner sides of the guide support 210 to each other and support the same. The support spring 230 may provide an elastic force to return the guide slot 220 to its original position when the guide pin 120 is removed from the guide slot 220.

A central end (e.g., the bottom of the middle portion) of the guide slot 220 may be connected to an inner side of a central end of the guide support 210 and may be formed in a round shape. The central end of the guide slot 220 may be in contact with the end of the guide pin 120 when the guide pin 120 is completely inserted thereto. A contact sensor 250 may be disposed on the inner side of the central end of the guide support 210 to detect whether the central end of the guide support 210 is in contact with the end of the guide pin 120.

As shown in FIG. 7, guide pin teeth 122 or 124 may be formed on each of two outer surfaces of the guide pin 120 in a length direction of the guide pin 120. The guide pin teeth 122 or 124 may be formed on each of the two outer surfaces of the guide pin 120 to be inclined in an opposite direction. In other words, the guide pin teeth 122 and 124 may respectively be formed on one surface in a forward direction and on the other surface in a reverse direction.

In addition, guide slot teeth 222 or 224 may be formed on each of two inner surfaces of the guide slot 220 in a length direction of the guide slot 220. The guide slot teeth 222 or 224 may be formed on each of the two inner surfaces of the guide slot 220 to be inclined in the opposite direction. In other words, the guide slot teeth 222 and 224 may respectively be formed on one surface in the reverse direction and on the other surface in the forward direction.

The guide slot teeth 222 or 224 and the guide pin teeth 122 or 124 may be engaged with each other when the guide pin 120 is inserted into the guide slot 220. In one embodiment, the guide slot teeth 222 or 224, which is engaged with the guide pin teeth 122 or 124 at a portion where the guide pin teeth 122 or 124 have a forward inclination, may have a reverse inclination, and the guide slot teeth 222 or 224, which is engaged with the guide pin teeth 122 or 124 at a portion where the guide pin teeth 122 or 124 have the reverse inclination, may have the forward inclination. This fastening structure may allow the guide pin 120 and the guide slot 220 to be securely and firmly fastened to each other or separated from each other, without clearance in a front-to-back direction.

Referring to FIGS. 8A and 8B, the joint structure of a vehicle body according to an embodiment of the present disclosure may further include the contact sensor 250 disposed at the end of the guide support 210. The contact sensor 250 may serve to detect whether the end of the guide pin 120 is in contact with an inner central end of the guide slot 220 when the guide pin 120 is inserted into the guide slot 220. The contact sensor 250 may be a limit sensor. In addition, the structure may include a non-contact proximity sensor instead of the contact sensor 250.

When the end of the guide pin 120 is in contact with the inner central end of the guide slot 220, the contact sensor 250 may generate the electrical signal and transmit the electrical signal to the actuator 240. The actuator 240 may be operated by the electrical signal, and configured to cause an actuator contact part 245 to protrude such that the actuator contact part 245 may be in contact with each of the two outer surfaces of the guide slot 220 and apply pressure thereto. As a result, the inserted guide pin 120 is firmly fixed to the guide slot 220.

The contact sensor 250 may include a sensor unit 252, a contact terminal 254, and a sensor spring 256. The sensor unit 252 may be disposed on each of two sides of a path where the guide pin 120 enters while having a stepped shape.

The contact terminal 254 may be moved along an inner side of the sensor unit 252. The guide pin 120 may be inserted into the guide slot 220, and in direct contact with the contact terminal 254. The contact terminal 254 may have one end moved in a length direction of the sensor unit 252 and the other end in contact with a stepped portion of the sensor unit 252.

The sensor spring 256 may be disposed between one end of the contact terminal 254 and the stepped portion of the sensor unit 252. When the guide pin 120 is released from its contact with the contact terminal 254, the sensor spring 256 may provide an elastic force to return the contact terminal 254 to its original position.

Meanwhile, the sensor unit 252 may be supported by a stopper 258 limiting an insertion movement distance of the guide pin 120. The stopper 258 may be made of an elastic member such as rubber and may relieve impact when inserting the guide pin 120.

The other end of the contact terminal 254 may come into contact with the sensor unit 252 when the guide pin 120 is inserted into the guide slot 220 and further moved to be in contact with the contact terminal 254. In other words, the guide pin 120 may be further moved until it can move the contact terminal 254, thereby generating the electrical signal. The electrical signal may cause to supply power to the actuator 240 through a wire 255, and the actuator 240 may be operated to be in contact with an outer side of the guide slot 220 to apply pressure thereto.

Figure 9A:
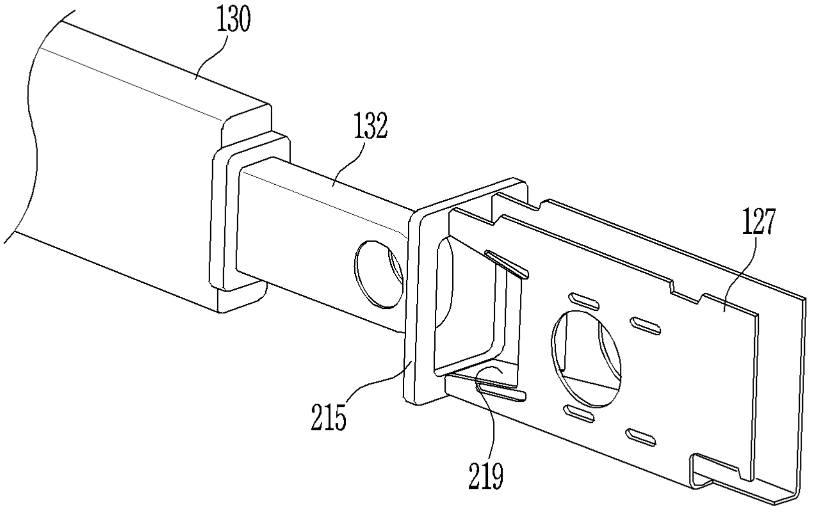
FIGS. 9A and 9B are diagrams schematically showing a joint relationship between an extension pin and an extension slot in the joint structure of a vehicle body according to an embodiment of the present disclosure.
Figure 9B:
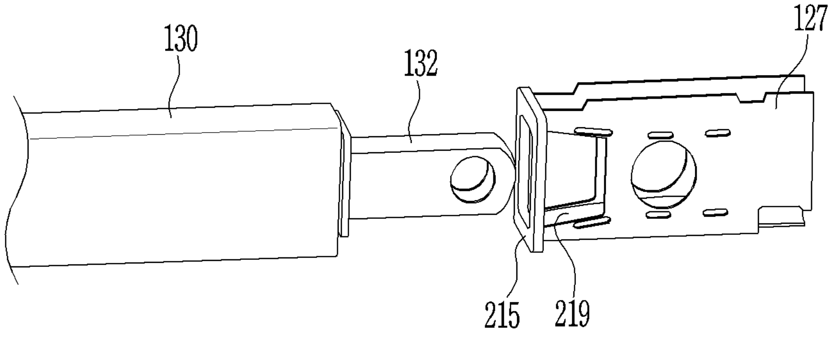
Figure 10A:
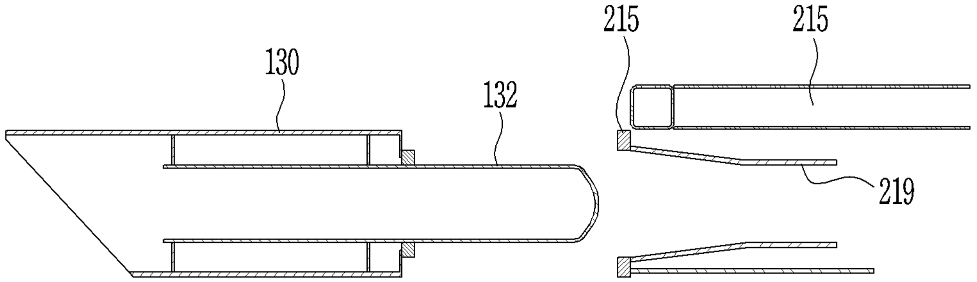
FIGS. 10A and 10B are diagrams schematically showing states before and after the extension pin is joined to the extension slot in the joint structure of a vehicle body according to an embodiment of the present disclosure.
Figure 10B:
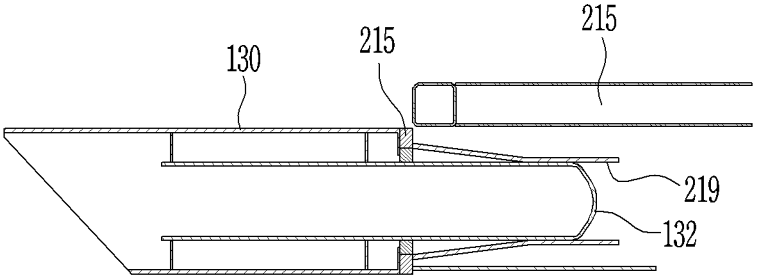

FIGS. 9A and 9B are diagrams schematically showing a joint relationship between an extension pin and an extension slot in the joint structure of a vehicle body according to an embodiment of the present disclosure; and FIGS. 10A and 10B are diagrams schematically showing states before and after the extension pin is joined to the extension slot in the joint structure of a vehicle body according to an embodiment of the present disclosure.

Referring to FIGS. 9A to 10B, an extension protrusion part 132 may protrude from an end of an extension pin 130 to the extension slot 213, and the extension protrusion part 132 may be inserted into the extension slot 213.

The extension slot 213 may include an extension opening 215 which is an entrance into which the extension pin 130 is inserted, a pair of extension opening supports 217 that support the extension opening 215 and are arranged to face or oppose each other, and a pair of extension pin fixation parts 219 disposed on inner sides of the extension opening supports 217 and gradually getting closer to each other as the extension pin fixation part is closer to the inner side from the extension opening 215.

When the extension protrusion part 132 is inserted, the extension pin fixation part 219 may be operated to be in contact with a side part of the extension protrusion part 132 and apply pressure to the side part to thus fix the same. The extension pin fixation parts 219 may have a cone shape in which the extension pin fixation parts 219 gradually get closer to each other as being moved to an inner side of the extension slot 213. The extension pin fixation parts 219 may provide elastic forces for the extension protrusion part 132 to return to its original position when the extension protrusion part 132 is removed from the extension slot 213.

Figure 11:
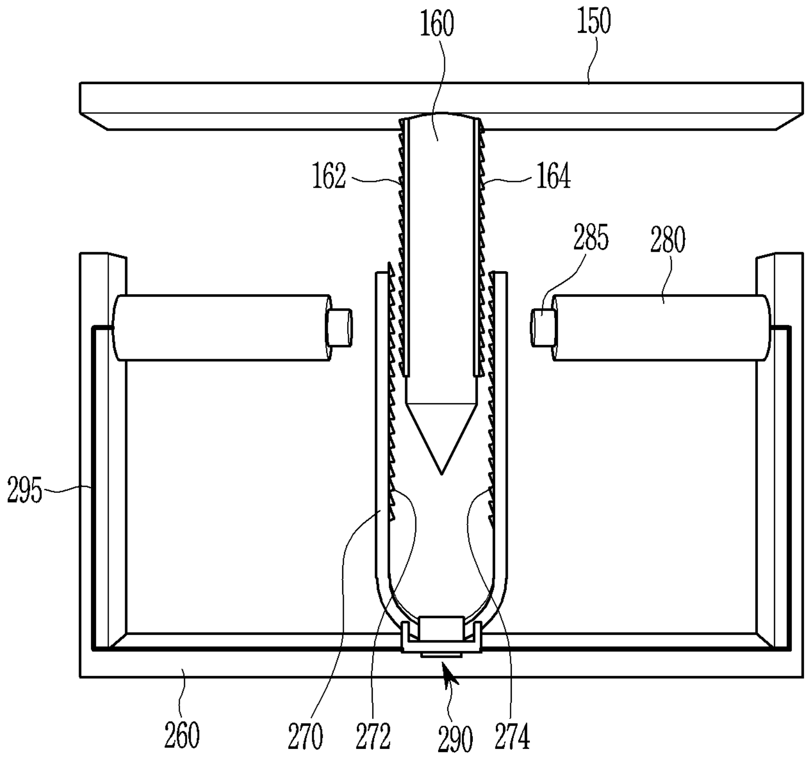
FIG. 11 is a diagram schematically showing a state before joint of a vehicle in a joint structure of a vehicle body according to another embodiment of the present disclosure.
Figure 12:
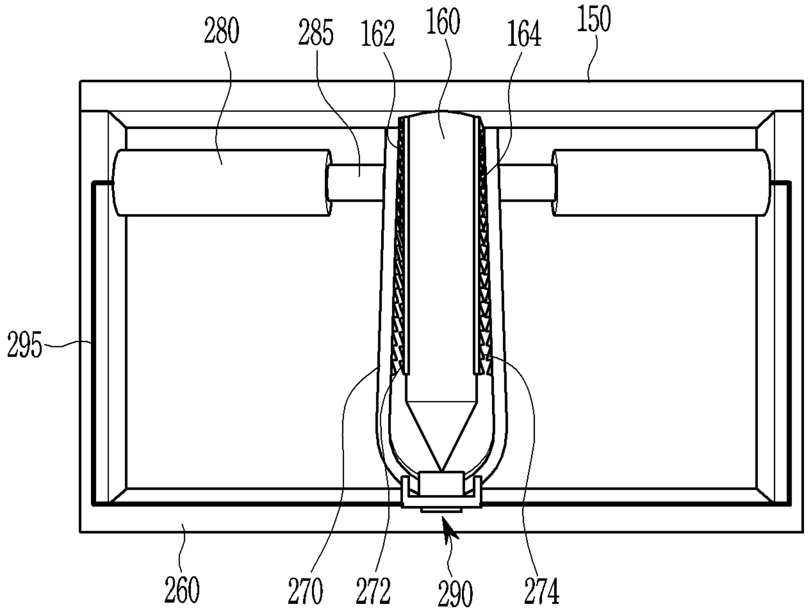
FIG. 12 is a diagram schematically showing a state after the joint of the vehicle body in the joint structure of a vehicle body according to another embodiment of the present disclosure.

FIG. 11 is a diagram schematically showing a state before joint of a vehicle in a joint structure of a vehicle body according to another embodiment of the present disclosure; and FIG. 12 is a diagram schematically showing a state after the joint of the vehicle body in the joint structure of a vehicle body according to another embodiment of the present disclosure.

Referring to FIGS. 11 and 12, in the joint structure of a vehicle body according to an embodiment of the present disclosure, a driving module 100 may include a fixation bar 150 and a guide pin 160. In addition, a space module 200 may include a guide slot 270 and a pair of actuators 280.

The fixation bar 150 may form a rear end of the driving module 100 and may be formed in a rectangular bar shape extending in a direction perpendicular to a length direction of the vehicle body.

A guide pin 160 may be disposed at a central portion of the fixation bar 150 and protrude to the space module 200. The guide pin 160 may have a cylindrical shape, and may have a diameter that becomes smaller as being further away from the fixation bar 150. In addition, an end of the guide pin 160 may be formed in a pointed shape. This shape may allow the guide pin 160 to be inserted smoothly into a guide slot 270.

The guide slot 270 may be formed in an inner central portion of the space module 200. The guide slot 270 may be an opening formed in a guide support 260 of the space module 200, and formed in a shape of a pincer retreating from the inner side of the space module 200 to an opposite side of the driving module 100. The guide pin 160 may be inserted into the guide slot 270, and the guide slot 270 may be in contact with each of two outer sides of the guide pin 160 to firmly fix the guide pin 160 to the guide slot 270.

The actuator 280 may be disposed in the space module 200, and may be in contact with each of two outer sides of a central portion of the guide slot 270 to apply pressure thereto. The actuator 280 may be operated by an electrical signal. The guide slot 270 may maintain the guide pin 160 to be fixed when the actuator 280 is operated to apply pressure to the guide slot 270 while the guide pin 160 is inserted into the guide slot 270.

Each of two ends of the guide slot 270 may not connected to an inner side of each guide support 260 included in the space module 200, and a central end of the guide slot 270 may be connected to an inner side of a central end of the guide support 260 while having a round shape.

The central end of the guide slot 270 may be in contact with an end of the guide pin 160 when the guide pin 160 is completely inserted thereto. A contact sensor 290 may be disposed on the inner side of the central end of the guide support 260 to detect whether the central end of the guide support 260 is in contact with the end of the guide pin 160.

Guide pin teeth 162 or 164 may be formed on each of two outer surfaces of the guide pin 160 in a length direction of the guide pin 160, and the guide pin teeth 162 or 164 may be formed on each of the two outer surfaces of the guide pin 160 to be inclined in an opposite direction.

In addition, guide slot teeth 272 or 274 may be formed on each of two inner surfaces of the guide slot 270 in a length direction of the guide slot 270, and the guide slot teeth 272 or 274 may be formed on each of the two inner surfaces of the guide slot 270 to be inclined in the opposite direction.

The guide slot teeth 272 or 274 and the guide pin teeth 162 or 164 may be engaged with each other when the guide pin 160 is inserted into the guide slot 270 to thus fix the guide pin 160 to the guide slot 270.

The contact sensor 290 may serve to detect whether the end of the guide pin 160 is in contact with an inner central end of the guide slot 270 when the guide pin 160 is inserted into the guide slot 270. The contact sensor 290 may be a limit sensor. In another embodiment, the structure may include a non-contact proximity sensor instead of the contact sensor 290.

When the end of the guide pin 160 is in contact with the inner central end of the guide slot 270, the contact sensor 290 may generate the electrical signal and transmit the electrical signal to the actuator 280. The actuator 280 may be operated by the electrical signal and cause an actuator contact part 285 to protrude, such that the actuator contact part 285 may be in contact with each of the two outer surfaces of the guide slot 270 and respectively apply pressure to the outer surfaces of the guide slot 270. As a result, the guide pin 160 may be inserted and fixed to the guide slot 270.

The other end of a contact terminal may come into contact with the sensor unit when the guide pin 160 is inserted into the guide slot 270 and further moved to contact the contact terminal. In other words, the guide pin 160 is further moved to thus move the contact terminal, thereby generating the electrical signal. The electrical signal may cause to supply power to the actuator 280 through a wire 295, and the actuator 280 may be operated to be in contact with an outer side of the guide slot 270 to apply pressure thereto.

As set forth above, according to the embodiments of the present disclosure, the joint structure of a vehicle body that includes the driving module and the space module joined to the rear end of the driving module may reduce the clearance between the two modules when the two modules are joined to each other such that the rigidity of the fastener is improved and the collision occurring between the two modules during the sudden start or brake of the driving module is avoided or prevented.

In addition, the structure may simultaneously employ the guide pin and the extension pin to limit the front-to-back or up-down movement of the vehicle, thereby ensuring the ride comfort of the passenger in the space module.

In addition, the structure may be widely used not only in the joint method of the PBV vehicle, but also in the method of fastening the trailer and the towing vehicle to each other, and apply the automatic method rather than the manual method, thereby providing the improved marketability.

Although the embodiments of the present disclosure have been described hereinabove, the scope of the present disclosure is not limited thereto, and all equivalent modifications easily modified by those having ordinary skill in the art to which the present disclosure pertains are intended to fall within the scope and spirit of the present disclosure.

DESCRIPTION OF SYMBOLS

1000: vehicle
100: driving module
200: space module
110, 150: fixation bar
120, 160: guide pin
122, 124, 162, 164: guide pin teeth
130: extension pin
132: extension protrusion part
210, 260: guide support
213: extension slot
215: extension opening
217: extension opening support
219: extension pin fixation part
220, 270: guide slot
222, 224, 272, 274: guide slot teeth
240, 280: actuator
245, 285 actuator contact part
250, 290: contact sensor
252: sensor unit
254: contact terminal
255, 295: wire
256: sensor spring
258: stopper

What is claimed is:

1. A joint structure of a vehicle body that includes a driving module and a space module joined to a rear end of the driving module, the joint structure comprising:
- a fixation bar disposed at the rear end of the driving module;
- a guide pin disposed at a central portion of the fixation bar and protruding to the space module;
- a pair of extension pins disposed on edge portions of the fixation bar and protruding to the space module;
- a guide slot configured to receive the guide pin, wherein the guide slot is configured to be recessed from an inner central portion of the space module and extend along a direction opposite to the driving module;
- extension slots which are disposed in edge portions of the space module and into which the pair of extension pins are inserted; and
- a pair of actuators disposed in the space module and configured to respectively contact outer sides of a central portion of the guide slot to apply pressure to the outer sides.

2. The joint structure of claim 1, wherein each of the outer sides of the central portion of the guide slot is connected to an inner side of a guide support of the space module.

3. The joint structure of claim 2, wherein an end of the guide slot is connected to an inner side of an end of the guide support.

4. The joint structure of claim 2, wherein each of the outer sides of the central portion of the guide slot is supported on the inner side of the guide support by a support spring.

5. The joint structure of claim 1, wherein the guide pin is formed in a cylindrical shape, and the guide slot is in contact with a side surface of the guide pin.

6. The joint structure of claim 5, wherein:

guide pin teeth are formed on each of outer surfaces of the guide pin in a length direction of the guide pin, and guide slot teeth engaged with the guide pin teeth are formed on each of two inner surfaces of the guide slot.

7. The joint structure of claim 6, wherein:

the guide pin teeth formed on the outer surfaces of the guide pin are inclined in an opposite direction, and the guide slot teeth formed on the two inner surfaces of the guide slot are inclined in an opposite direction.

8. The joint structure of claim 3, wherein the pair of actuators each have an actuator contact part disposed at an end and configured to move to contact an outer side of the guide slot.

9. The joint structure of claim 8, wherein a contact sensor is disposed at the end of the guide support to detect whether an end of the guide pin is in contact with an inner central end of the guide slot when the guide pin is inserted into the guide slot.

10. The joint structure of claim 9, wherein when the end of the guide pin is in contact with the inner central end of the guide slot, the contact sensor transmits an electrical signal to at least one of the pair of actuators such that the pair of actuators are moved to contact each of the outer sides of the guide slot and apply pressure to the outer sides.

11. The joint structure of claim 10, wherein the contact sensor includes:

a sensor unit, a contact terminal in contact with the guide pin and configured to move along an inner side of the sensor unit, and a sensor spring interposed between the inner side of the sensor unit and the contact terminal and configured to provide an elastic force to the contact terminal.

12. The joint structure of claim 11, wherein the sensor unit is supported by a stopper configured to limit an insertion movement distance of the guide pin.

13. The joint structure of claim 12, wherein when the guide pin is moved to move the contact terminal and the end of the contact terminal is in contact with the sensor unit, the electrical signal is generated, the electrical signal supplies power to the pair of actuators, and the pair of actuators are operated to contact the outer sides of the central portion of the guide slot to apply pressure to the outer sides.

14. The joint structure of claim 1, wherein:

an extension protrusion part protrudes from an end of each extension pin of the pair of extension pins to the extension slots, and the extension protrusion parts of the pair of extension pins are inserted into the extension slots.

15. The joint structure of claim 14, wherein the extension slots each includes:

an extension opening, a pair of extension opening supports supporting the extension opening and opposing each other, and a pair of extension pin fixation parts disposed on inner sides of the extension opening supports and gradually getting closer to each other as the extension pin fixation part is closer to the inner side from the extension opening.

16. The joint structure of claim 15, wherein when an extension protrusion part of the extension protrusion parts is inserted, the pair of extension pin fixation parts are operated to contact a side part of the extension protrusion part and apply pressure to the side part to thus fix the side part.

17. A joint structure of a vehicle body that includes a driving module and a space module joined to the driving module, the joint structure comprising:

a fixation bar disposed at a rear end of the driving module;

a guide pin disposed at a central portion of the fixation bar and protruding to the space module;

a guide slot configured to receive the guide pin, wherein the guide slot is configured to recess from an inner central portion of the space module and extend in a direction opposite to the driving module; and a pair of actuators disposed in the space module and configured to contact two outer sides of a central portion of the guide slot and apply pressure to the two outer sides of the central portion.

18. The joint structure of claim 17, wherein an end of the guide slot is connected to an inner side of an end of a guide support of the space module.

19. The joint structure of claim 18, wherein:

guide pin teeth are formed on each of outer surfaces of a central portion of the guide pin in a length direction of the guide pin, guide slot teeth engaged with the guide pin teeth are formed on each of two inner surfaces of the guide slot, the guide pin teeth are inclined in an opposite direction, and the guide slot teeth are inclined in an opposite direction.

* * * * *